Sept. 29, 1964    P. F. DE VALLIERE    3,150,535
SCREW-TYPE CONTROLS, PARTICULARLY IN
MACHINE-TOOL APPLICATIONS
Filed Nov. 22, 1960    2 Sheets-Sheet 1

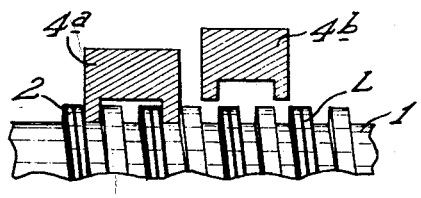
Fig. 3
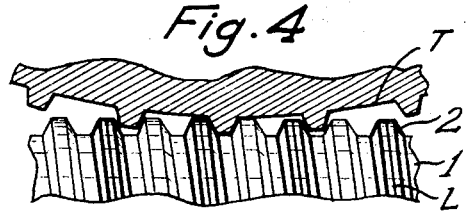
Fig. 4
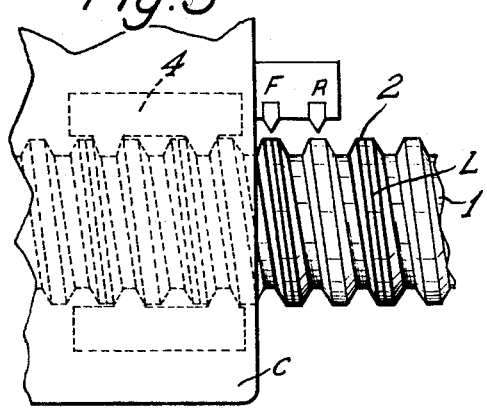
Fig. 5
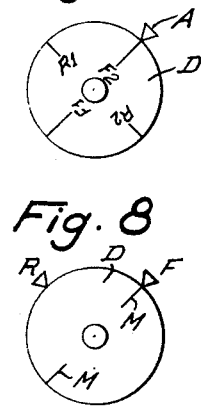
Fig. 7
Fig. 8
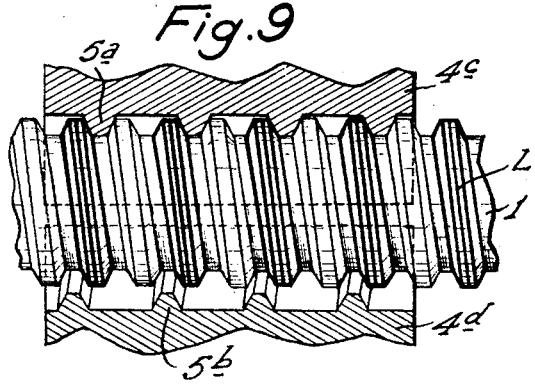
Fig. 9
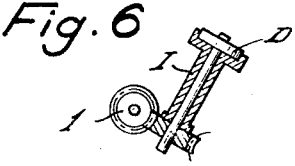
Fig. 6

United States Patent Office 3,150,535
Patented Sept. 29, 1964

3,150,535
SCREW-TYPE CONTROLS, PARTICULARLY IN MACHINE-TOOL APPLICATIONS
Pierre Francois de Valliere, 14 Ave. de Bretteville, Neuilly-sur-Seine, France
Filed Nov. 22, 1960, Ser. No. 70,964
Claims priority, application France, Nov. 23, 1959, 810,919, Patent 1,250,510
4 Claims. (Cl. 74—424.8)

The invention relates to improvements in screw-type controls particularly those used in machine tool application.

In screw-cutting machines the tool carriage is traversed by a lead screw which is subjected to rapid wear, due to the frequency of the passes of the tool carriage over the lead screw. Moreover, such wear is often of a localized nature as the result of the different types of work performed.

The work phases most liable to cause wear in traversing components are the roughing passes.

The present invention has for its object to reduce the effect of such wear in lead screws.

To this end, the invention comprises a screw-type control device, the screw of which has at least two threads of identical pitch.

One such thread is then used to control the roughing passes and the other to control only the finishing passes.

In cases where such a screw-type control comprises a nut, the latter is provided with a single thread which is made to engage with one or the other of the threads on the screw, as desired.

Such a screw may likewise be used as a tangent-screw, in which case the associated wheel is provided with a set of teeth meshing with only one thread of the screw, as in the case of the nut referred to precedingly.

The description which follows with reference to the accompanying drawing given by way of example only and not in a limiting sense will give a clear understanding of how the invention may be performed.

In the drawing, FIG. 1 is a partial section view of the manner of engagement of a nut with the first thread of a lead screw.

FIG. 3 shows partially in section a further embodiment of the invention in which two nuts are utilized each for cooperating with a respective thread of the lead screw.

Figure 1:
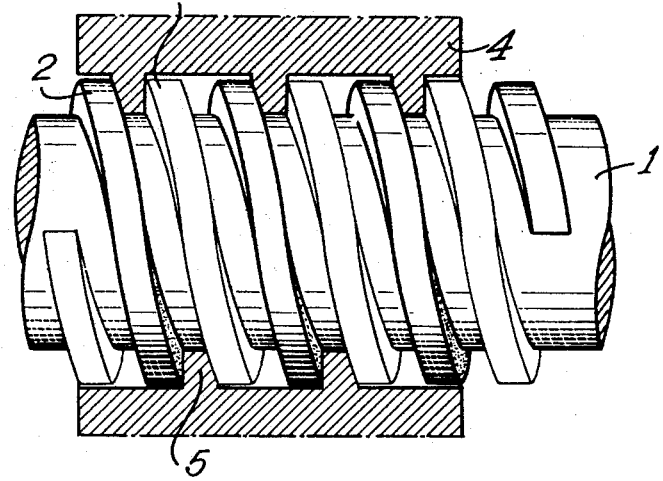
Figure 2:
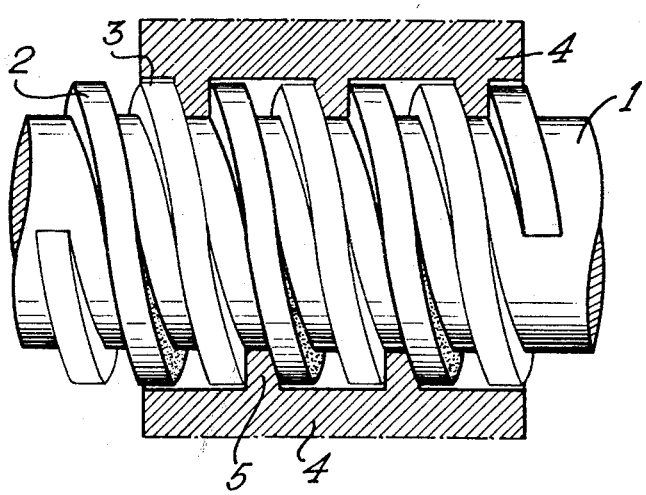
FIG. 2 is a similar view of the manner of engagement of the nut with the second thread.

FIG. 4 shows partially in section an embodiment in which a tangent wheel selectively engages a thread set on the lead screw, FIG. 5 diagrammatically shows embodiment in which the operative position can visually be identified, FIGS. 6–8 are schematic representation of thread indicators which are associated with visible indicia representative of the various operative positions, and FIG. 9 shows partially in section a further embodiment of the invention in which a pair of half-nuts are utilized each in engagement with a respective thread set on the lead screw.

The screw illustrated consists of a core 1 on which is provided a thread 2 drawn in thick lines and a thread 3 identical to the thread 2 but drawn in thin lines.

The nut 4 which cooperates with the screw 1 is provided with an interior thread 5 which follows the flanks of the thread 2. Consequently, roughing passes carried out with the aid of thread 2 will wear out only the flank of that thread.

To carry out the finishing passes, the nut 4, after having been opened, can be re-introduced onto the screw 1, this time in contact with the corresponding flank of the thread 3, on which flank the wear provoked will be distinctly less.

In this way, machining and finishing accuracy are both improved.

Instead of using a single nut 4, provision could be made for two different nuts 4a, 4b, one of which 4a, for example, would be used in contact with one of the two threads 2 for the roughing passes the other 4b being out of contact with the threads. Similarly 4b contacts thread 3 for the finishing passes nut 4b being out of contact with thread 2 during this operation.

Such a screw 1 can likewise be used for other control systems of the tangent-screw type, such as for controlling lathe traversing motion, through cooperation with a toothed gearing T capable of cooperating with each of the screw threads alternatively as a single nut as described above with reference to FIG. 1.

In a screw-cutting lathe, the carriage C may be provided with two pointers marked R for "roughing" and F for "finishing," to enable the correct positioning of the nut 4 or of its control system. It would also be of advantage to provide one of the screw threads 2, for example, with some suitable mark such as a continuous line L traced on the head of the thread 2 to permit identification.

In cases where utilization is made of a known thread indicator, as shown schematically in FIGS. 6, 7 and 8 the dial D of such a device may be provided with two graduation marks $R_1$, $R_2$ and $F_1$, and $F_2$ offset from each other by half a pitch (FIG. 7) and movable before an index A marked in a part of said indicator which surrounds said dial D with two indices R, F, also marked on said part surrounding said dial D, before which are movable the known marks M, said index being likewise out of step by half a pitch. In cases where a nut is used, utilization may be made of two half-nuts 4c, 4d, meshing alternatively with the screw 1, the interior threads 5a, 5b of half-nuts 4c, 4d being out of step by half a pitch with respect to each other FIG. 9. Consequently threads 5a are engaged with one set of threads on the lead screw while threads 5b are engaged with the others of the sets of threads on the lead screw, and the half nuts are selectively utilized in accordance with the desired operation.

It is to be clearly understood that many modifications can be made to the embodiments described hereinabove without departing from the scope of the invention.

What I claim is:

1. Apparatus comprising a lead screw including two sets of threads and a single openable nut secured to a carriage and having threads which can be engaged selectively with either of the sets of the threads of the screw one at a time for advancing the carriage, respectively for a roughing operation and for a finishing operation in correspondence with the set of threads of the screw which is drivingly engaged.

2. Apparatus comprising a lead screw including two sets of threads, and a single gear wheel having teeth which can be engaged selectively with either of the sets of threads of the screw, one at a time for advancing a carriage, respectively for a roughing operation and for a finishing operation in correspondence with the set of threads of the screw which is drivingly engaged.

3. Apparatus comprising a lead screw including two sets of threads, and first and second half nuts spaced a half pitch on the lead screw for engaging a respective set of threads of the lead screw, one at a time for advancing a carriage, respectively for a roughing operation and for a finishing operation in correspondence with the set of threads of the screw which is drivingly engaged.

4. Apparatus comprising a lead screw including two sets of threads, and first and second nuts each engageable with a respective set of threads of the lead screw, one at a time for advancing a carriage, respectively for a roughing operation and for a finishing operation in correspondence with the set of threads of the screw which is drivingly engaged.

References Cited in the file of this patent

UNITED STATES PATENTS

| | | |
|---|---|---|
| 1,885,970 | Westling | Nov. 1, 1932 |
| 1,900,740 | Scott et al. | Mar. 7, 1933 |
| 2,323,010 | Conradson | June 29, 1943 |

FOREIGN PATENTS

| | | |
|---|---|---|
| 951,788 | Germany | Oct. 31, 1956 |